(12) United States Patent
Naruse

(10) Patent No.: US 7,533,527 B2
(45) Date of Patent: May 19, 2009

(54) HYDRAULIC DRIVE DEVICE FOR WORK MACHINE

(75) Inventor: Masami Naruse, Komatsu (JP)

(73) Assignee: Komatsu Ltd., Tokyo (JP)

( * ) Notice: Subject to any disclaimer, the term of this patent is extended or adjusted under 35 U.S.C. 154(b) by 238 days.

(21) Appl. No.: 11/547,743

(22) PCT Filed: Apr. 6, 2005

(86) PCT No.: PCT/JP2005/006755

§ 371 (c)(1),
(2), (4) Date: Oct. 6, 2006

(87) PCT Pub. No.: WO2005/098148

PCT Pub. Date: Oct. 20, 2005

(65) Prior Publication Data

US 2007/0204604 A1    Sep. 6, 2007

(30) Foreign Application Priority Data

Apr. 8, 2004    (JP) .............................. 2004-114081

(51) Int. Cl.
*E02F 9/20* (2006.01)
*F02D 29/00* (2006.01)
*F15B 11/00* (2006.01)

(52) U.S. Cl. .......................................... 60/433; 701/50
(58) Field of Classification Search .................... 60/433; 701/50
See application file for complete search history.

(56) References Cited

U.S. PATENT DOCUMENTS

| 4,773,369 A * | 9/1988 | Kobayashi et al. ............ 60/434 |
| 4,904,161 A | 2/1990 | Kamide et al. |
| 5,077,973 A | 1/1992 | Suzuki et al. |
| 5,111,789 A | 5/1992 | Moriya et al. |
| 5,481,875 A | 1/1996 | Takamura et al. |
| 5,527,156 A * | 6/1996 | Song ........................... 60/449 |
| 5,638,677 A | 6/1997 | Hosono et al. |
| 5,878,721 A * | 3/1999 | Nakamura .................. 123/496 |
| 5,930,996 A | 8/1999 | Nakamura et al. |
| 6,020,651 A * | 2/2000 | Nakamura et al. ........ 290/40 R |

(Continued)

FOREIGN PATENT DOCUMENTS

EP    0 404 953 A1    1/1991

(Continued)

*Primary Examiner*—Thomas E Lazo
(74) *Attorney, Agent, or Firm*—Frishauf, Holtz, Goodman & Chick, P.C.

(57) ABSTRACT

A primary object is to provide a hydraulic drive device for a work machine that is capable of optimum control of pump absorption horsepower according to a change of working condition, thereby reducing fuel consumption, and a secondary object is to provide a hydraulic drive device for a work machine that is based on this primary object and capable of restraining variations in the pump absorption horsepower. When working condition identifying unit (41) determines that, for example, a working condition has changed from working condition (a) to (b), engine control system (40a) changes engine output torque characteristic line from engine output torque characteristic line (ELa) to (ELb), and hydraulic pump control system (40b) changes hydraulic pump absorption torque characteristic line from hydraulic pump absorption torque characteristic line (PLa) to (PLb). At output torque points (Ma), (Mb) at which output of engine (17) reaches a maximum, output torque of engine (17) is matched with absorption torque of hydraulic pump (18).

9 Claims, 11 Drawing Sheets

U.S. PATENT DOCUMENTS

| | | | |
|---|---|---|---|
| 6,161,522 A * | 12/2000 | Fuchita et al. | 123/385 |
| 6,170,262 B1 | 1/2001 | Yoshimura et al. | |
| 6,183,210 B1 | 2/2001 | Nakamura | |
| 6,336,067 B1 * | 1/2002 | Watanabe et al. | 701/50 |
| 6,339,737 B1 | 1/2002 | Yoshimura et al. | |
| 7,068,675 B1 * | 6/2006 | Shitaya | 701/33 |
| 7,289,895 B2 * | 10/2007 | Ishimoto et al. | 701/50 |
| 2006/0167607 A1 | 7/2006 | Nakamura et al. | |
| 2006/0235595 A1 | 10/2006 | Sawada | |
| 2007/0227137 A1 | 10/2007 | Naruse | |

FOREIGN PATENT DOCUMENTS

| | | |
|---|---|---|
| EP | 1 655 469 A1 | 5/2006 |
| GB | 2 421 808 A | 7/2006 |
| JP | 2-38630 A | 2/1990 |
| JP | 04-194383 A | 7/1992 |
| JP | 05-086635 A | 4/1993 |
| JP | 08-218442 A | 8/1996 |
| JP | 10-205368 A | 8/1998 |
| JP | 11-002144 A | 1/1999 |
| JP | 11-107321 A | 4/1999 |
| JP | 11-293710 A | 10/1999 |
| JP | 2986471 B2 | 10/1999 |
| JP | 3064574 B2 | 5/2000 |
| JP | 2002-295408 A | 10/2002 |
| WO | 98/06936 A1 | 2/1998 |

* cited by examiner (a)

(b)

η : Equivalent fuel consumption curve (c)

η : Equivalent fuel consumption curve

HYDRAULIC DRIVE DEVICE FOR WORK MACHINE This application is a U.S. National Phase Application under 35 USC 371 of International Application PCT/JP2005/006755 filed Apr. 6, 2005.

TECHNICAL FIELD

The present invention relates to a hydraulic drive device suitable for a work machine such as a hydraulic excavator.

BACKGROUND ART

Known hydraulic drive devices of the above type are proposed by, for example, patent documents 1, 2. The hydraulic drive device of patent document 1 is configured to set an engine output torque characteristic and a hydraulic pump absorption torque characteristic that are suitable for a working mode selected by an operator. The hydraulic drive device of patent document 2 is configured to detect a certain operation status of, for example, an implement through detection of a certain operation status of an operating lever and set a maximum value of absorption torque of a hydraulic pump at a predetermined value in accordance with the implement's certain operation status when the implement is in that operation status.

Here, patent document 1 is Japanese Patent Unexamined Publication No. H02-38630, and patent document 2 is Japanese Patent Unexamined Publication No. 2002-295408.

In the hydraulic drive device of patent document 1, when a heavy excavation mode is selected by the operator, an engine is operated at full load, and the engine output torque characteristic indicated by line ELa in FIG. 11(a) is set. This engine output torque characteristic line ELa has regulation line Ra set for set engine speed NA and is set such that output (horsepower) of the engine reaches a maximum at engine speed Na. Output torque Ta of the engine corresponds to this engine speed Na (Hereinafter, an output torque point specified by engine speed Na and engine output torque Ta is referred to as "output torque point Ma"). The hydraulic pump absorption torque characteristic indicated by line PLa in FIG. 11(a) is also set through adjustment of the amount of oil discharged from a variable displacement hydraulic pump (hereinafter simply referred to as "hydraulic pump"). This hydraulic pump absorption torque characteristic line PLa is set to be a monotone increasing function having engine speed as a variable. At output torque point Ma, the output torque of the engine is matched with the absorption torque of the hydraulic pump (Hereinafter, such a condition is referred to as "matching"). This means that the hydraulic pump absorbs the engine horsepower at output torque point Ma, i.e., the maximum horsepower of the engine, thereby allowing high-efficiency heavy excavation work. A method of, for example, setting engine output torque Ta and engine speed Na, which specify output torque point Ma, as target values as described above and increasing and reducing the absorption torque of the hydraulic pump based on calculation of a difference between the target engine speed and an actual engine speed for matching the absorption torque of the hydraulic pump with the engine output torque at output torque point Ma is called "engine speed sensing control" and is a publicly known technique.

When an excavation mode or a leveling mode is selected by the operator, the engine is operated at partial load, and the engine output torque characteristic indicated by line ELc in FIG. 11(b) is set in the above-mentioned hydraulic drive device. Engine output torque characteristic line ELc has regulation line Rc set for set engine speed NC. The hydraulic pump absorption torque characteristic indicated by line PLc in FIG. 11(b) is also set through the adjustment of the amount of oil discharged from the hydraulic pump. Here, the absorption torque of the hydraulic pump is controlled at values along an equivalent horsepower curve of the engine according to the set engine speed. A method of matching such absorption torque of the hydraulic pump with the output torque of the engine is called "equivalent horsepower control". In the case of FIG. 11(b), matching is done between the output torque of the engine and the absorption torque of the hydraulic pump at output torque point Mc specified by engine speed Nc and engine output torque Tc corresponding to engine speed Nc (Hereinafter, output torque point Mc is referred to as "matching point Mc"). This case allows the matching between the engine output torque and the absorption torque of the hydraulic pump at matching point Mc which has a lower fuel consumption rate (g/kw·h) than that of matching point Mc' which is specified when the set engine speed is NA, so that the engine is used within a range of better fuel efficiency while maintaining the same horsepower.

In the hydraulic drive device of patent document 2, when, for example, the certain operation status of the operating lever is detected with the heavy excavation mode selected, the hydraulic pump absorption torque characteristic indicated by line PLd in FIG. 11(c) is set through the adjustment of the amount of oil discharged from the hydraulic pump. Here, the absorption torque of the hydraulic pump is kept constant. A method of matching such absorption torque of the hydraulic pump with the output torque of the engine is called "constant torque control". In the case of FIG. 11(c), the matching is done between the output torque of the engine and the absorption torque of the hydraulic pump at output torque point Md specified by engine speed Nd and engine output torque Td corresponding to engine speed Nd (Hereinafter, output torque point Md is referred to as "matching point Md"). Setting the maximum value of the absorption torque of the hydraulic pump at matching point Md in accordance with the implement's certain operation status when the implement is in that operation status limits the hydraulic pump to an output required for the operation, thus reducing fuel consumption at the time of light-load operation.

DISCLOSURE OF THE INVENTION

Problems to be Solved by the Invention

In a job performed by a hydraulic excavator, required engine and pump outputs vary greatly, for example, between work which involves excavating earth, scooping up the excavated earth with a bucket, swinging an upper structure while lifting a boom and then loading a dump truck with the earth from the bucket and work that follows the earth loading and involves swinging the upper structure while lowering the boom for the next work cycle.

If the above-mentioned series of operations is carried out in the case of FIG. 11(a) where the heavy excavation mode is selected, the hydraulic drive device of patent document 1 cannot vary the engine output and the pump output according to the nature of the operation which changes every moment during that series of operations, the operating amount of the operating lever or a change of working condition, thus problematically consuming unnecessary energy, depending on the working condition.

When the above-mentioned series of operations is carried out, the hydraulic drive device of patent document 2 limits the pump output according to the change of working condition as shown in FIG. 11(c), thereby restraining the consumption of unnecessary energy. However, the engine is operated along regulation line Ra (between engine speeds NA and Nd) during that series of operations. This problematically causes the fuel consumption rate to always remain poor, leading to unnecessary fuel consumption.

Matching the output torque of the engine with the absorption torque of the hydraulic pump at matching points Mc, Md on respective regulation lines Rc, Ra as shown in FIGS. 11(b) and 11(c) cannot provide desired pump absorption horsepower because marked variations in pump absorption horsepower (i.e., horsepower absorbed from the engine by the hydraulic pump) arise in proportion to variations in the hydraulic pump absorption torque characteristic (indicated by line width ΔQ defined by alternate long and two short dashes lines in the drawings) that result from, for example, a manufacturing problem of the hydraulic pump. Consequently, favorable working efficiency cannot be maintained.

To address the problems discussed above, a primary object of the present invention is to provide a hydraulic drive device for a work machine that is capable of optimum control of pump absorption horsepower according to a change of working condition, thereby reducing fuel consumption, and a secondary object of the present invention is to provide a hydraulic drive device for a work machine that is based on this primary object and capable of restraining variations in the pump absorption horsepower, thereby maintaining favorable working efficiency.

Means for Solving the Problems

To achieve the primary object, a hydraulic drive device for a work machine according to a first aspect of the present invention includes:
  an engine;
  a hydraulic pump driven by the engine;
  a hydraulic actuator operated by pressure oil discharged from the hydraulic pump;
  working condition identifying means for identifying working conditions;
  engine controlling means for controlling output torque of the engine; and
  hydraulic pump controlling means for controlling absorption torque of the hydraulic pump,
  wherein when the working condition identifying means determines that a working condition has changed from a first working condition of the working conditions to a different working condition of the working conditions, the engine controlling means changes an engine output torque characteristic from a first one corresponding to the first working condition to a different one corresponding to the different working condition, and the hydraulic pump controlling means changes a hydraulic pump absorption torque characteristic from a first one corresponding to the first working condition to a different one corresponding to the different working condition.

To achieve the secondary object, a hydraulic drive device for a work machine according to a second aspect of the present invention includes:
  an engine;
  a hydraulic pump driven by the engine;
  a hydraulic actuator operated by pressure oil discharged from the hydraulic pump;
  working condition identifying means for identifying working conditions;
  engine controlling means for controlling output torque of the engine; and
  hydraulic pump controlling means for controlling absorption torque of the hydraulic pump,
  wherein when the working condition identifying means identifies a first working condition of the working conditions, the engine controlling means controls the output torque of the engine to achieve a first engine output torque characteristic corresponding to the first working condition, and the hydraulic pump controlling means controls the absorption torque of the hydraulic pump to achieve a first hydraulic pump absorption torque characteristic matching the absorption torque of the hydraulic pump with the output torque of the engine that corresponds to one of an engine speed at which output of the engine reaches a maximum when the first engine output torque characteristic is set and an engine speed in the vicinity of the engine speed at which the output of the engine reaches the maximum when the first engine output torque characteristic is set,
  wherein when the working condition identifying means identifies a different working condition of the working conditions, the engine controlling means controls the output torque of the engine to achieve a different engine output torque characteristic corresponding to the different working condition, and the hydraulic pump controlling means controls the absorption torque of the hydraulic pump to achieve a different hydraulic pump absorption torque characteristic matching the absorption torque of the hydraulic pump with the output torque of the engine that corresponds to one of an engine speed at which the output of the engine reaches a maximum when the different engine output torque characteristic is set and an engine speed in the vicinity of the engine speed at which the output of the engine reaches the maximum when the different engine output torque characteristic is set, and
  wherein when the working condition identifying means determines that a working condition has changed from the first working condition to the different working condition, the engine controlling means changes the engine output torque characteristic from the first one to the different one, and the hydraulic pump controlling means changes the hydraulic pump absorption torque characteristic from the first one to the different one.

To achieve the secondary object, a hydraulic drive device for a work machine according to a third aspect of the present invention includes:
  an engine;
  a hydraulic pump driven by the engine;
  a hydraulic actuator operated by pressure oil discharged from the hydraulic pump;
  working condition identifying means for identifying working conditions;
  engine controlling means for controlling output torque of the engine; and
  hydraulic pump controlling means for controlling absorption torque of the hydraulic pump,
  wherein when the working condition identifying means identifies a first working condition of the working conditions, the engine controlling means controls the output torque of the engine to achieve a first engine output torque characteristic corresponding to the first working condition, and the hydraulic pump controlling means controls the absorption torque of the hydraulic pump to achieve a first hydraulic pump absorption torque characteristic matching the absorption torque of the hydraulic pump with the output torque of the engine that corresponds to a predetermined engine speed between an engine speed at which the output torque of the engine reaches a maximum when the first engine output torque characteristic is set and an engine speed at which output of the engine reaches a maximum when the first engine output torque characteristic is set, the first hydraulic pump absorption torque characteristic increasing the absorption torque of the hydraulic pump with increase in the engine speed and reducing the absorption torque of the hydraulic pump with decrease in the engine speed, wherein when the working condition identifying means identifies a different working condition of the working conditions, the engine controlling means controls the output torque of the engine to achieve a different engine output torque characteristic corresponding to the different working condition, and the hydraulic pump controlling means controls the absorption torque of the hydraulic pump to achieve a different hydraulic pump absorption torque characteristic matching the absorption torque of the hydraulic pump with the output torque of the engine that corresponds to a predetermined engine speed between an engine speed at which the output torque of the engine reaches a maximum when the different engine output torque characteristic is set and an engine speed at which the output of the engine reaches a maximum when the different engine output torque characteristic is set, the different hydraulic pump absorption torque characteristic increasing the absorption torque of the hydraulic pump with increase in the engine speed and reducing the absorption torque of the hydraulic pump with decrease in the engine speed, and wherein when the working condition identifying means determines that the working condition has changed from the first working condition to the different working condition, the engine controlling means changes the engine output torque characteristic from the first one to the different one, and the hydraulic pump controlling means changes the hydraulic pump absorption torque characteristic from the first one to the different one.

According to a fourth aspect of the present invention that is based on the first, second or third aspect, it is preferable that the working condition identifying means includes at least one of operation status detecting means for detecting an operation status of the hydraulic actuator and discharge pressure detecting means for detecting discharge pressure of the hydraulic pump and identifies the working conditions based on at least one of a detection result provided by the operation status detecting means and a detection result provided by the discharge pressure detecting means.

According to a fifth aspect of the present invention that is based on the first, second, third or fourth aspect, it is preferable that the engine controlling means gradually changes the engine output torque characteristic from the first one to the different one and that the hydraulic pump controlling means gradually changes the hydraulic pump absorption torque characteristic from the first one to the different one.

Advantageous Effect of the Invention

According to the first aspect of the invention, when the working condition identifying means determines that the working condition has changed from the first working condition to the different working condition, the engine controlling means changes the engine output torque characteristic from the first one corresponding to the first working condition to the different one corresponding to the different working condition, and the hydraulic pump controlling means changes the hydraulic pump absorption torque characteristic from the first one corresponding to the first working condition to the different one Corresponding to the different working condition. This enables optimum control of the horsepower absorbed from the engine by the hydraulic pump (hereinafter referred to as "pump absorption horsepower") according to the change of working conditions whereby unnecessary fuel consumption can be eliminated, resulting in reduction in fuel consumption.

It is needless to say that the second aspect of the invention provides the same advantages as the first aspect of the invention. According to this second aspect, when the first working condition is identified by the working condition identifying means, the first engine output torque characteristic corresponding to the first working condition is set, and the first hydraulic pump absorption torque characteristic is set, matching the absorption torque of the hydraulic pump with the engine's output torque corresponding to one of the engine speed at which the output (horsepower) of the engine reaches the maximum when the first engine output torque characteristic is set and the engine speed in the vicinity of the engine speed at which the output (horsepower) of the engine reaches the maximum when the first engine output torque characteristic is set. Accordingly, even in the event of variations in the first hydraulic pump absorption torque characteristic due to a manufacturing problem or the like of the hydraulic pump, the hydraulic pump always absorbs the engine horsepower in the vicinity of a point at which the engine's output reaches the maximum when the first engine output torque characteristic is set. When the working condition identifying means identifies the working condition different from the first working condition, the different engine output torque characteristic corresponding to this different working condition is set, and the different hydraulic pump absorption torque characteristic is set, matching the hydraulic pump's absorption torque with the engine's output torque corresponding to one of the engine speed at which the engine's output (horsepower) reaches the maximum when the different engine output torque characteristic is set and the engine speed in the vicinity of the engine speed at which the engine's output (horsepower) reaches the maximum when the different engine output torque characteristic is set. Accordingly, even in the event of variations in the different hydraulic pump absorption torque characteristic due to the hydraulic pump's manufacturing problem or the like, the hydraulic pump always absorbs the engine horsepower in the vicinity of a point at which the engine's output reaches the maximum when the different engine output torque characteristic is set. Compared to the extent of engine horsepower variation in a speed governing range of the engine, the extent of the engine horsepower variation in the vicinity of the engine's maximum output point is significantly smaller. In the second aspect of the invention, pump absorption horsepower variation can thus be restrained significantly in any of the first and different working condition cases compared to the pump absorption horsepower variations in the prior techniques illustrated by FIGS. 11(b) and 11(c) where the hydraulic pump absorption torque characteristics are set each matching the hydraulic pump's absorption torque with the engine's output torque in the speed governing range of the engine. Consequently, the favorable working efficiency is maintained.

It is needless to say that the third aspect of the invention provides the same advantages as the first aspect of the invention. According to this third aspect, when the first working condition is identified by the working condition identifying means, the first engine output torque characteristic corresponding to the first working condition is set, the first hydraulic pump absorption torque characteristic is set, matching the hydraulic pump's absorption torque with the engine's output torque corresponding to the predetermined engine speed between the engine speed at which the engine's output torque reaches the maximum when the first engine output torque characteristic is set and the engine speed at which the engine's output (horsepower) reaches the maximum when the first engine output torque characteristic is set, and this first hydraulic pump absorption torque characteristic increases the hydraulic pump's absorption torque with increase in the engine speed and reduces the hydraulic pump's absorption torque with decrease in the engine speed. Accordingly, even in the event of variations in the first hydraulic pump absorption torque characteristic due to the hydraulic pump's manufacturing problem or the like, absorption torque variation of the hydraulic pump is restrained significantly. When the working condition identifying means identifies the working condition different from the first working condition, the different engine output torque characteristic corresponding to this different working condition is set, the different hydraulic pump absorption torque characteristic is set, matching the hydraulic pump's absorption torque with the engine's output torque corresponding to the predetermined engine speed between the engine speed at which the engine's output torque reaches the maximum when the different engine output torque characteristic is set and the engine speed at which the engine's output (horsepower) reaches the maximum when the different engine output torque characteristic is set, and this different hydraulic pump absorption torque characteristic increases the hydraulic pump's absorption torque with increase in the engine speed and reduces the hydraulic pump's absorption torque with decrease in the engine speed. Accordingly, even in the event of variations in the different hydraulic pump absorption torque characteristic due to the hydraulic pump's manufacturing problem or the like, the absorption torque variation of the hydraulic pump is restrained significantly. In the third aspect of the invention, the hydraulic pump's absorption torque variation is restrained significantly in any of the first and different working condition cases, whereby the pump absorption horsepower variation can be restrained significantly compared to the pump absorption horsepower variation in the prior technique illustrated by FIG. 11(b) or 11(c) where the variations in hydraulic pump absorption torque characteristic arise substantially as variations in absorption torque of the hydraulic pump. Consequently, the favorable working efficiency is maintained.

Adopting the fourth aspect of the invention can facilitate and ensure the identification of the working condition which changes every moment.

According to the fifth aspect of the invention, the changing from the first engine output torque characteristic to the different engine output torque characteristic and the changing from the first hydraulic pump absorption torque characteristic to the different hydraulic pump absorption torque characteristic are performed gradually, so that, for example, a steep change in the engine speed and impact on the hydraulic actuator and others can be eased.

Figure 1:
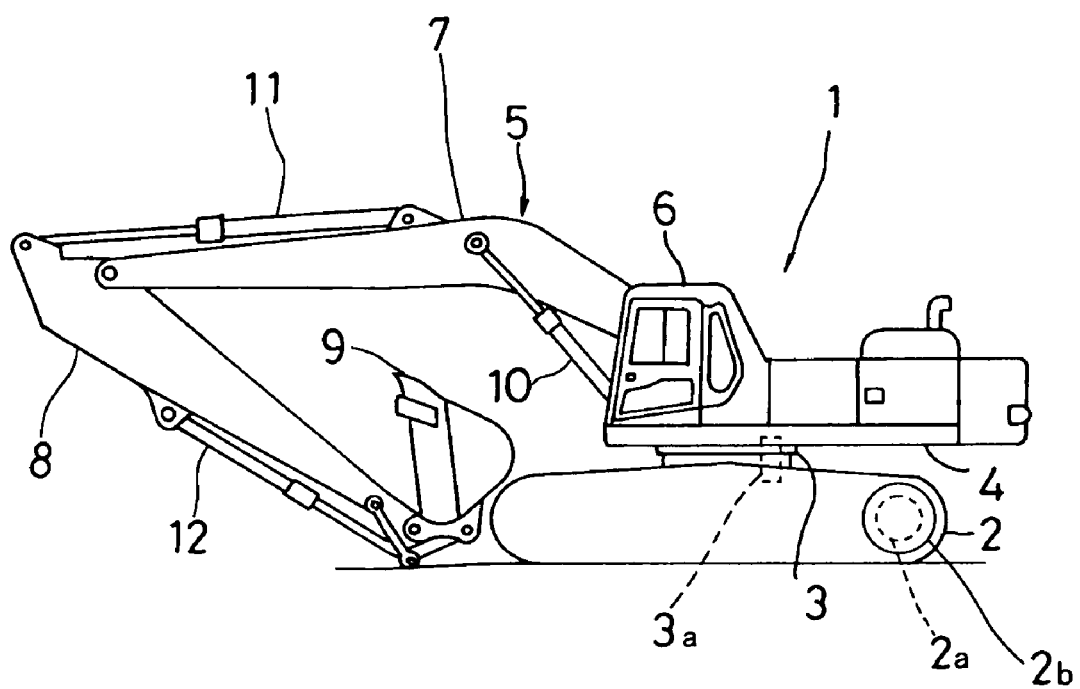
FIG. 1 is a side view of a hydraulic excavator in accordance with a first exemplary embodiment of the present invention.

DESCRIPTION OF REFERENCE MARKS IN THE DRAWINGS 1 hydraulic excavator
17 engine
18 hydraulic pump
20 hydraulic actuator
21 fuel injection system
22 engine controller
24 pump controller
25 speed sensor
28 solenoid operated proportional control valve
29 pressure sensor (discharge pressure detecting means)
37 hydraulic switch (operation status detecting means)
38 potentiometer (operation status detecting means)
39 monitor panel
40 engine/hydraulic pump control system
40a engine control system
40b hydraulic pump control system
41 working condition identifying unit
42 pump absorption torque command controller
43 control current command controller
44 throttle command controller
ELa, ELa', ELb, ELb' engine output torque characteristic lines
PLa, PLa', PLb, PLb' hydraulic pump absorption torque characteristic lines
PLe, PLg hydraulic pump absorption torque characteristic lines
WLa engine output characteristic line

DETAILED DESCRIPTION OF THE PREFERRED EMBODIMENTS

Concrete exemplary embodiments of a hydraulic drive device for a work machine according to the present invention are demonstrated hereinafter with reference to the accompanying drawings. The following embodiments are examples in which the invention is applied in a hydraulic excavator as the work machine.

First Exemplary Embodiment

Figure 2:
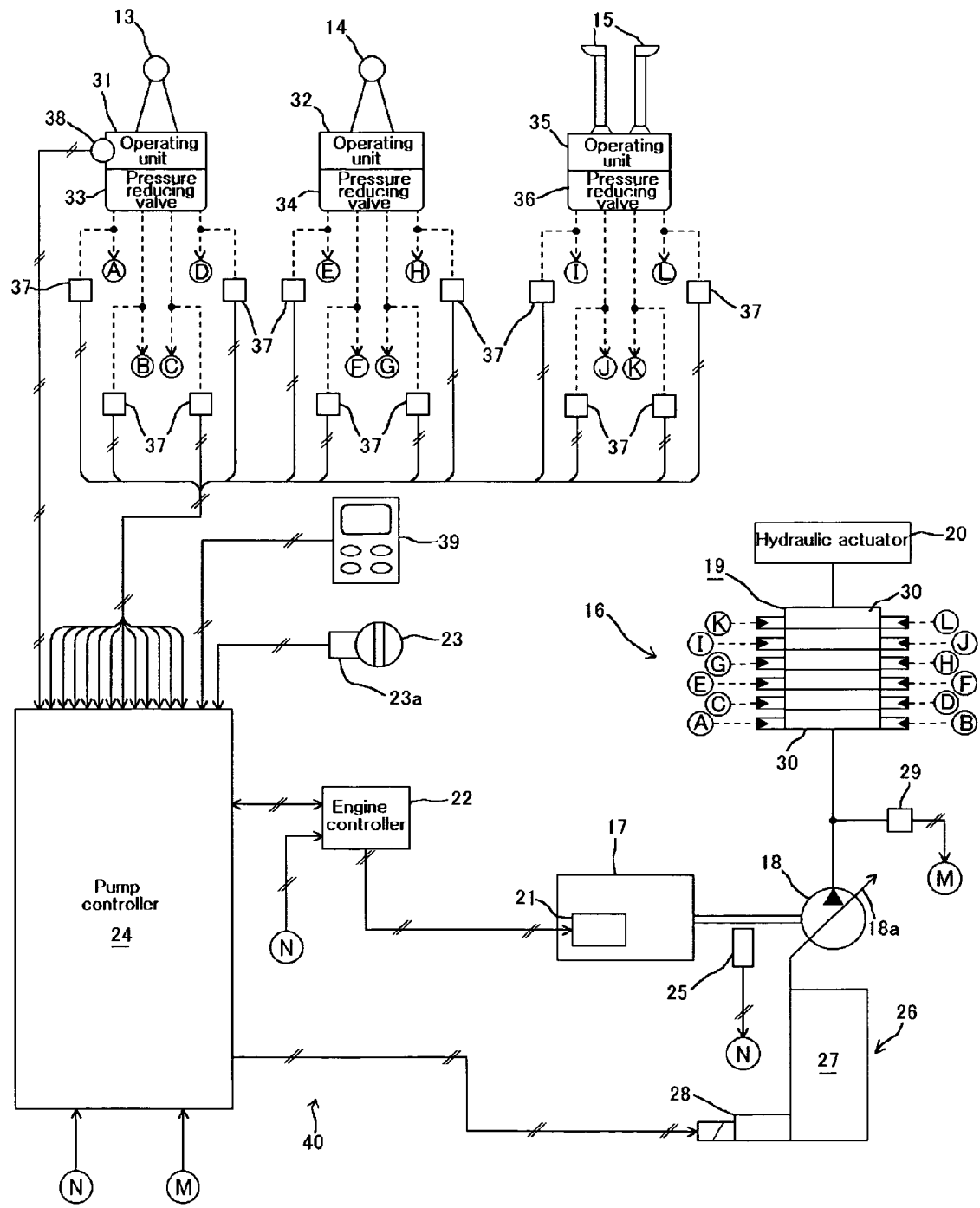
FIG. 2 schematically shows a general system configuration of a hydraulic drive device in accordance with the first embodiment.
Figure 3:
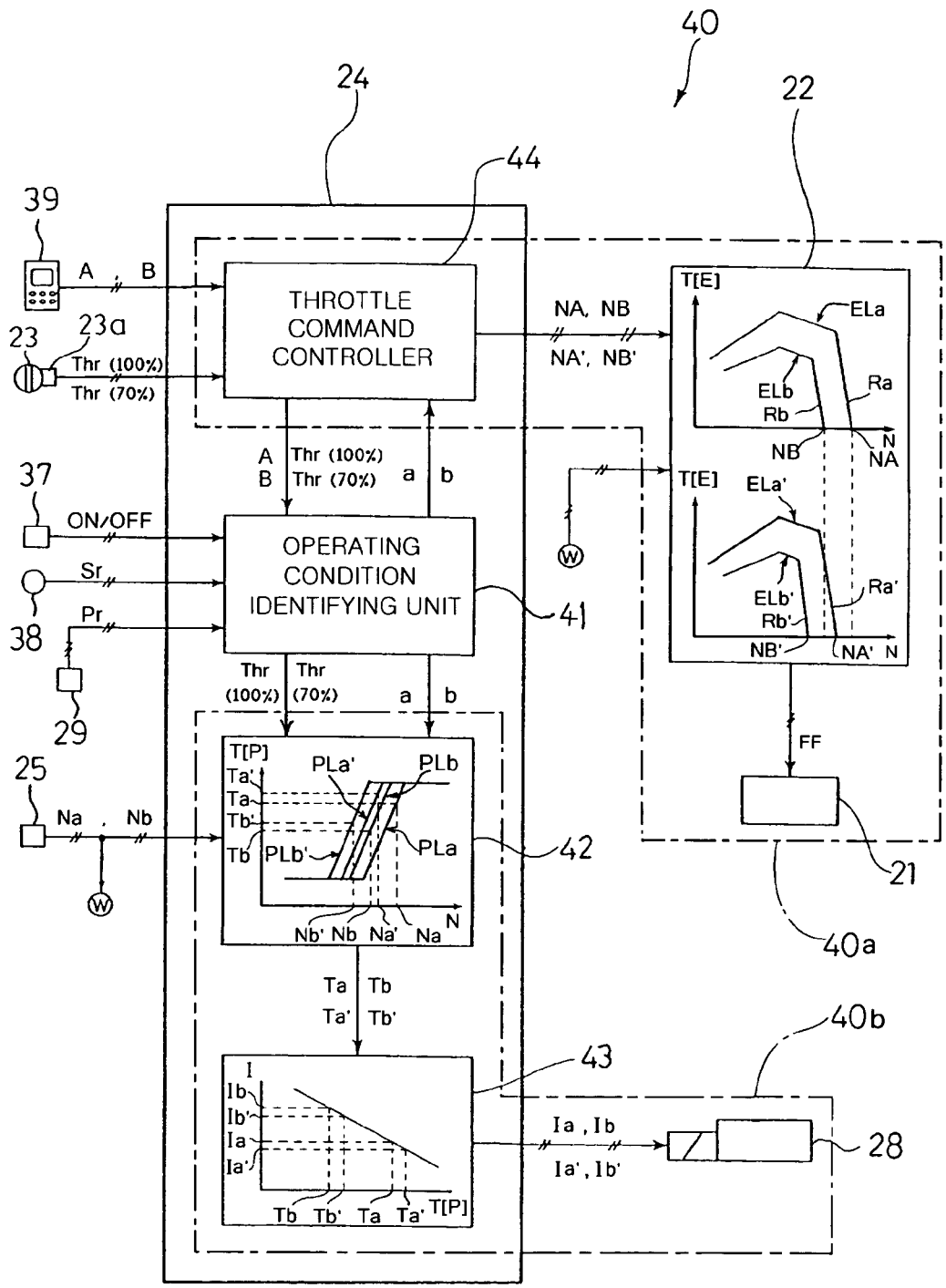
FIG. 3 is a functional block diagram of an engine/hydraulic pump control system in accordance with the first embodiment.

FIG. 1 is a side view of a hydraulic excavator in accordance with the first exemplary embodiment of the invention. FIG. 2 schematically shows a general system configuration of a hydraulic drive device in accordance with the first embodiment, and FIG. 3 is a functional block diagram of an engine/ hydraulic pump control system in accordance with this embodiment.

As shown in FIG. 1, hydraulic excavator 1 of the present embodiment is constructed of undercarriage 2 including travel device 2b driven by hydraulic motor 2a for travel, swing device 3 driven by hydraulic motor 3a for swings, upper structure 4 disposed above undercarriage 2 via swing device 3, implement 5 attached to a central front position of upper structure 4, and operator's cab 6 provided at a left front position of upper structure 4. Implement 5 is formed of boom 7, arm 8 and bucket 9 that are pivotally connected in this order from the side of upper structure 4, and hydraulic cylinders (boom cylinder 10, arm cylinder 11 and bucket cylinder 12) are disposed to correspond to boom 7, arm 8 and bucket 9, respectively. In operator's cab 6, implement operating levers 13, 14 (see FIG. 2) are disposed on both sides of an operator's seat (not shown in the drawing) for operating swinging motions of upper structure 4 and flexing/up-and-down motions of implement 5, while a pair of travel operating levers 15, 15 (see FIG. 2) are disposed in front of the operator's seat for operating traveling motions of undercarriage 2.

Hydraulic circuit 16 such as shown in FIG. 2 is incorporated in hydraulic excavator 1. This hydraulic circuit 16 is designed to feed and discharge operating pressure oil discharged from hydraulic pump 18 driven by engine 17 to and from hydraulic actuator 20 (comprised of boom cylinder 10, arm cylinder 11, bucket cylinder 12, hydraulic motor 2a for traveling and hydraulic motor 3a for swinging) through operating valve 19. Through operation of this hydraulic circuit 16, the flexing/up-and-down motions of implement 5, the swinging motions of upper structure 4 and the traveling motions of undercarriage 2 are carried out.

Engine 17 is a diesel engine provided with accumulator (common rail) type fuel injection system 21. This fuel injection system 21 itself is publicly known and is therefore not illustrated in detail in the drawing. This system 21 is configured to store fuel under pressure in a common rail by means of a fuel transfer pump and inject the fuel from an injector by opening and closing of a solenoid-controlled valve. A fuel injection characteristic is determined by a drive signal sent from engine controller 22 to the solenoid-controlled valve, and desired injection characteristics can be obtained for all speeds of engine 17 ranging from a low speed range to a high speed range. In the present embodiment, a so-called electronically controlled injection system is configured to include fuel injection system 21, engine controller 22 and various sensors. In this electronically controlled injection system, a target injection characteristic is mapped by digital values, whereby engine output torque characteristics such as shown schematically in engine controller 22 of FIG. 3 can be obtained. For setting a throttling amount of engine 17, fuel dial 23 is provided, and potentiometer 23a is provided to fuel dial 23 for outputting a throttle signal (hereinafter referred to as "first throttle signal") to pump controller 24. Speed sensor 25 detects an actual speed of engine 17 and outputs a resulting detection signal to engine controller 22 and pump controller 24.

Hydraulic pump 18 is a variable displacement hydraulic pump provided with electro-hydraulic servo mechanism 26. This electro-hydraulic servo mechanism 26 is composed of regulator 27 for regulating a pivot angle of swash plate 18a of hydraulic pump 18 by means of the pressure oil discharged from hydraulic pump 18, and solenoid operated proportional control valve 28 for controlling regulator 27 based on control current from pump controller 24. Pump controller 24 outputs the control current value used for controlling the pivot angle of swash plate 18a of hydraulic pump 18 for the purpose of increasing or reducing absorption torque of hydraulic pump 18 according to a difference between a set engine speed read, the setting being based on the above-mentioned first throttle signal sent from potentiometer 23a of fuel dial 23 and a working mode command signal sent from monitor panel 39 (described later), and the actual engine speed read from the actual engine speed signal sent from speed sensor 25. For detecting discharge pressure of hydraulic pump 18, pressure sensor 29 is provided. This pressure sensor 29 outputs a pump discharge pressure signal to pump controller 24.

Operating valve 19 is a collection of hydraulic pilot controlled directional control valves 30 which is provided corresponding to hydraulic actuator 20 (hydraulic motor 2a for traveling, hydraulic motor 3a for swinging, boom cylinder 10, arm cylinder 11 and bucket cylinder 12). Pilot pressure oils output from pressure reducing valves 33, 34, 36 (described later) are supplied to these directional control valves 30 for specified oil path switches.

Implement operating levers 13, 14 are provided with respective pressure reducing valves 33, 34 via respective operating units 31, 32 which output various operation commands corresponding to respective lever operations. Similarly, travel operating levers 15, 15 are provided with pressure reducing valve 36 via operating unit 35 which outputs various operation commands corresponding to respective lever operations. Each of pressure reducing valves 33, 34, 36 is supplied with the pilot pressure oil from a pilot pump not shown in the drawing, regulates the supplied pilot pressure oil based on the operation command and outputs the regulated pilot pressure oil to operating valve 19. The pilot pressure oils output from pressure reducing valves 33, 34, 36 are input to specified pilot pressure oil input ports of operating valve 19, whereby the specified oil path switches are performed. In this way, the swinging motions of upper structure 4 and the flexing/up-and-down motions of implement 5 are achieved in response to the specified operations of implement operating levers 13, 14, and the traveling motions of undercarriage 2 are achieved in response to the specified operations of travel operating levers 15, 15. The operation signals indicative of respective operation statuses of implement and travel operating levers 13, 14, 15, 15 are input to pump controller 24 through respective hydraulic switches 37 provided to pressure reducing valves 33, 34, 36. In the present embodiment, those operation signals input to pump controller 24 in response to the specified operations of operating levers 13, 14, 15, 15 total twelve signals which are:

(1) a right swing operation signal corresponding to the right swinging motion of upper structure 4;
(2) a left swing operation signal corresponding to the left swinging motion of upper structure 4;
(3) a boom-up operation signal corresponding to the upward motion of boom 7;
(4) a boom-down operation signal corresponding to the downward motion of boom 7;
(5) an arm dumping operation signal corresponding to the forward motion of arm 8;
(6) an arm excavating operation signal corresponding to the retracting motion of arm 8;
(7) a bucket dumping operation signal corresponding to the forward motion of bucket 9;
(8) a bucket excavating operation signal corresponding to the retracting motion of bucket 9;
(9) a right forward travel operation signal corresponding to the right forward traveling motion of undercarriage 2;
(10) a right backward travel operation signal corresponding to the right backward traveling motion of undercarriage 2;

(11) a left forward travel operation signal corresponding to the left forward traveling motion of undercarriage 2; and
(12) a left backward travel operation signal corresponding to the left backward traveling motion of undercarriage 2.

Operating unit 31 is provided with potentiometer 38 which outputs operating amounts of implement operating lever 13 that are associated with the respective arm dumping, arm excavating, bucket dumping and bucket excavating operations in the form of respective electric signals, i.e., an arm dump operating amount signal, an arm excavation operating amount signal, a bucket dump operating amount signal and a bucket excavation operating amount signal. These operating amount signals are input from potentiometer 38 to pump controller 24.

Operator's cab 6 has monitor panel 39 functioning as a setting unit for allowing an operator to select a desired working mode from a plurality of working modes. In the present embodiment, a description is provided of a heavy excavation mode and an economy mode as the two selectable working modes for the sake of convenience.

The hydraulic drive device of this embodiment is provided with engine/hydraulic pump control system 40 mainly comprised of engine controller 22, pump controller 24, the various sensors and the various setting units. Referring to the functional block diagram of FIG. 3, a detailed description is hereinafter provided of this engine/hydraulic pump control system 40.

Pump controller 24 is comprised of working condition identifying unit 41 (which corresponds to "working condition identifying means" in the invention), pump absorption torque command controller 42, control current command controller 43 and throttle command controller 44.

The first throttle signal from potentiometer 23a provided to fuel dial 23 and the working mode command signal from monitor panel 39 are input to working condition identifying unit 41 through throttle command controller 44 (described later). Working condition identifying unit 41 also receives the operation signals from respective hydraulic switches 37, the operating amount signals from potentiometer 38 provided to operating unit 31 and the pump discharge pressure signal from pressure sensor 29. Working condition identifying unit 41 identifies the present working condition based on these input signals and outputs an identification result in the form of an working condition signal ((a) or (b)) to pump absorption torque command controller 42 and throttle command controller 44. A working condition identifying procedure of working condition identifying unit 41 is detailed later.

Pump absorption torque command controller 42 receives the actual engine speed signal from speed sensor 25 and the working condition signal and the first throttle signal from working condition identifying unit 41. This pump absorption torque command controller 42 also stores a plurality of mapped hydraulic pump absorption torque characteristics preset based on the working conditions and the working modes. Each of the hydraulic pump absorption torque characteristics is a correlation between the torque absorbed from engine 17 by hydraulic pump 18 (hereinafter simply referred to as "absorption torque") and the engine speed. In the present embodiment, the hydraulic pump absorption torque characteristic indicated by line PLa in the drawing is preset to correspond to working condition (a) and the heavy excavation mode, while the hydraulic pump absorption torque characteristic indicated by line PLb in the drawing is preset to correspond to working condition (b) and the economy mode. It should be noted that more hydraulic pump absorption torque characteristics may be preset based on the working conditions and the working modes.

Pump absorption torque command controller 42 outputs a pump absorption torque command value which is determined based on the hydraulic pump absorption torque characteristic line selected based on the working condition signal and the working mode command signal and the actual engine speed signal sent from speed sensor 25. For example, if working condition (a) is identified by working condition identifying unit 41 and the actual engine speed is Na, hydraulic pump absorption torque characteristic line PLa is selected, whereby pump absorption torque value Ta corresponding to engine speed Na is output as the pump absorption torque command value. If working condition (b) is identified by working condition identifying unit 41 and the actual engine speed is Nb, hydraulic pump absorption torque characteristic line PLb is selected, whereby pump absorption torque value Tb corresponding to engine speed Nb is output as the pump absorption torque command value.

Control current command controller 43 receives the pump absorption torque command value from pump absorption torque command controller 42. This control current command controller 43 also stores the control current values corresponding to the respective pump absorption torque command values to be sent to solenoid operated proportional control valve 28. Control current command controller 43 determines the control current value based on the pump absorption torque command value from pump absorption torque command controller 42 and outputs this control current value to solenoid operated proportional control valve 28. For example, if pump absorption torque command value Ta is received from pump absorption torque command controller 42, control current value Ia corresponding to pump absorption torque command value Ta is output to solenoid operated proportional control valve 28. If pump absorption torque command value Tb is received from pump absorption torque command controller 42, control current value Ib corresponding to pump absorption torque command value Tb is output to solenoid operated proportional control valve 28. It is to be noted here that control current command controller 43 is capable of modulation. Thus, this controller 43 gradually increases the control current value over fixed period of time $\Delta t_B$ ($=t_6-t_5$) when switching the control current value from Ia to Ib and gradually decreases the control current value over fixed period of time $\Delta t_A$ ($=t_4-t_3$) when switching the current value from Ib to Ia (see FIG. 6). In the present embodiment, $\Delta t_A > \Delta t_B$.

Throttle command controller 44 receives the working mode command signal from monitor panel 39, the first throttle signal from potentiometer 23a of fuel dial 23 and the working condition signal from working condition identifying unit 41. This throttle command controller 44 determines a second throttle signal based on these input signals and outputs the resulting second throttle signal to engine controller 22. With fuel dial 23 set in a widest position (full position), first throttle signal $Thr_{(100\%)}$ whose magnitude indicates set engine speed NA is input to throttle command controller 44. In this case, if the working mode command signal input to throttle command controller 44 is heavy excavation mode command signal (A), throttle command controller 44 outputs to engine controller 22 second throttle signal (NA) whose magnitude indicates set engine speed NA. If the working mode command signal input to throttle command controller 44 is economy mode command signal (B) with fuel dial 23 set in the same position as the above case, throttle command controller 44 outputs to engine controller 22 second throttle signal (NB) whose magnitude indicates set engine speed NB (It is to be noted that NB<NA).

In cases where first throttle signal $Thr_{(100\%)}$, heavy excavation mode command signal (A) and working condition signal (a) are input to throttle command controller 44, throttle command controller 44 outputs second throttle signal (NA) to engine controller 22. In cases where first throttle signal $Thr_{(100\%)}$, heavy excavation mode command signal (A) and working condition signal (b) are input to throttle command controller 44, throttle command controller 44 outputs second throttle signal (NB) to engine controller 22. In cases where first throttle signal $Thr_{(100\%)}$, economy mode command signal (B) and working condition signal (a) are input to throttle command controller 44, throttle command controller 44 outputs second throttle signal (NA) to engine controller 22. In cases where first throttle signal $Thr_{(100\%)}$, economy mode command signal (B) and working condition signal (b) are input to throttle command controller 44, throttle command controller 44 outputs second throttle signal (NB) to engine controller 22.

It is to be noted here that throttle command controller 44 is capable of modulation. Thus, this controller 44 gradually decreases the second throttle signal over fixed period of time $\Delta t_B$ ($=t_6-t_5$) when switching the second throttle signal from (NA) to (NB) and gradually increases the second throttle signal over fixed period of time $\Delta t_A$ ($=t_4-t_3$) when switching the second throttle signal from (NB) to (NA) (see FIG. 6).

Engine controller 22 receives the second throttle command signal from throttle command controller 44. This engine controller 22 also stores the plurality of mapped engine output torque characteristics of different output torque levels throughout the entire engine speed range. In this embodiment, the engine output torque characteristic, indicated by line ELa in the drawing, and which has regulation line Ra, is preset to correspond to second throttle command signal (NA), while the engine output torque characteristic, indicated by line ELb in the drawing, and which has regulation line Rb, is preset to correspond to second throttle command signal (NB). Engine controller 22 determines the amount of fuel injection by referring to the actual engine speed signal and the fuel injection characteristic map (not shown in the drawing) based on the engine output torque characteristic map and outputs to fuel injection system 21 drive signal (FF) satisfying the determined amount of fuel injection. It should be noted that more engine output torque characteristics may be preset based on the working conditions and the working modes.

It should also be noted here that engine control system 40a including throttle command controller 44, engine controller 22 and fuel injection system 21 corresponds to "engine controlling means" in the invention, and hydraulic pump control system 40b including pump absorption torque command controller 42, control current command controller 43 and solenoid operated proportional control valve 28 corresponds to "hydraulic pump controlling means" in the invention.

Figure 4:
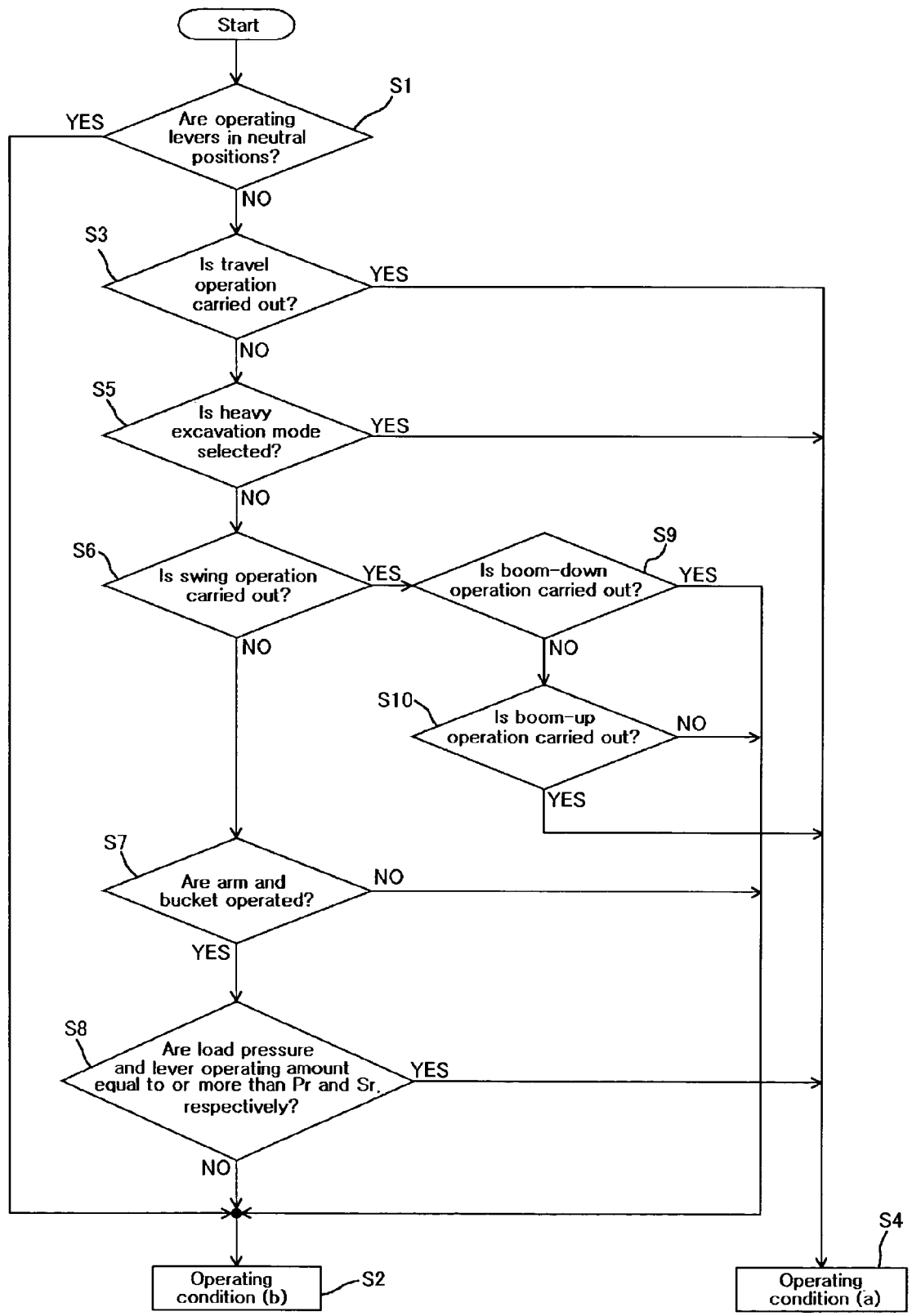
FIG. 4 is a flowchart of a procedure for identifying a working condition.

Referring to the flowchart of FIG. 4, a description is provided next of the working condition identifying procedure of working condition identifying unit 41. In the drawing, reference marks S denote steps.

Steps S1 to S6: A determination is made as to whether implement operating levers 13, 14 and travel operating levers 15, 15 are in neutral positions (S1). If implement operating levers 13, 14 and travel operating levers 15, 15 are in the neutral positions, working condition (b) is identified (S2). If it is determined that implement operating levers 13, 14 and travel operating levers 15, 15 are not in the neutral positions, a determination is made as to whether the travel operation is carried out (S3). If it is determined that the travel operation is carried out, working condition (a) is identified (S4). If it is determined that the travel operation is not carried out, a determination is made as to whether the working mode is the heavy excavation mode (S5). If the working mode is the heavy excavation mode, working condition (a) is identified (S4). If the working mode is not the heavy excavation mode, but the economy mode, a determination is made as to whether the swing operation of upper structure 4 is carried out (S6).

Steps S7 to S8: If it is determined in the step S6 that the swing operation of upper structure 4 is not carried out, a determination is made as to whether arm 8 and bucket 9 are operated (S7). If it is determined that arm 8 and bucket 9 are not operated, working condition (b) is identified (S2). If arm 8 and bucket 9 are operated, a determination is made as to whether discharge pressure (load pressure) P of hydraulic pump 18 is equal to or more than specified pressure Pr and operating amount S of the lever associated with the operation of arm 8 and bucket 9 is equal to or more than specified amount Sr (S8). If $P \geq Pr$ and $S \geq Sr$, working condition (a) is identified (S4). If $P<Pr$ and $S<Sr$, working condition (b) is identified (S2).

Steps S9 to S10: If it is determined in step S6 that the swing operation of upper structure 4 is carried out, a determination is made as to whether the boom-down operation is carried out (S9). If the boom-down operation is carried out, working condition (b) is identified (S2). If the boom-down operation is not carried out, a determination is made as to whether the boom-up operation is carried out (S10). If the boom-up operation is not carried out, working condition (b) is identified (S2). If the boom-up operation is carried out, working condition (a) is identified (S4).

Figure 5:
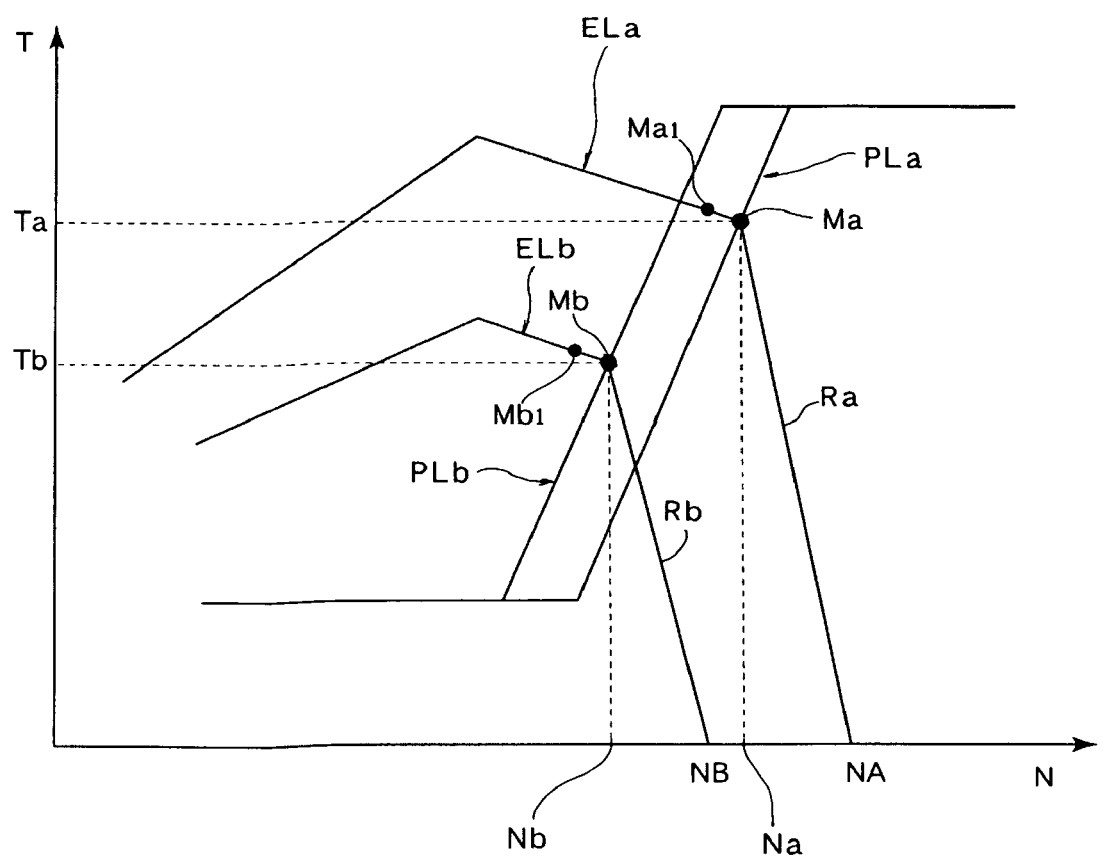
FIG. 5 shows characteristic lines illustrating relationships between output torque of an engine and absorption torque of a hydraulic pump in accordance with the first embodiment.
Figure 6:
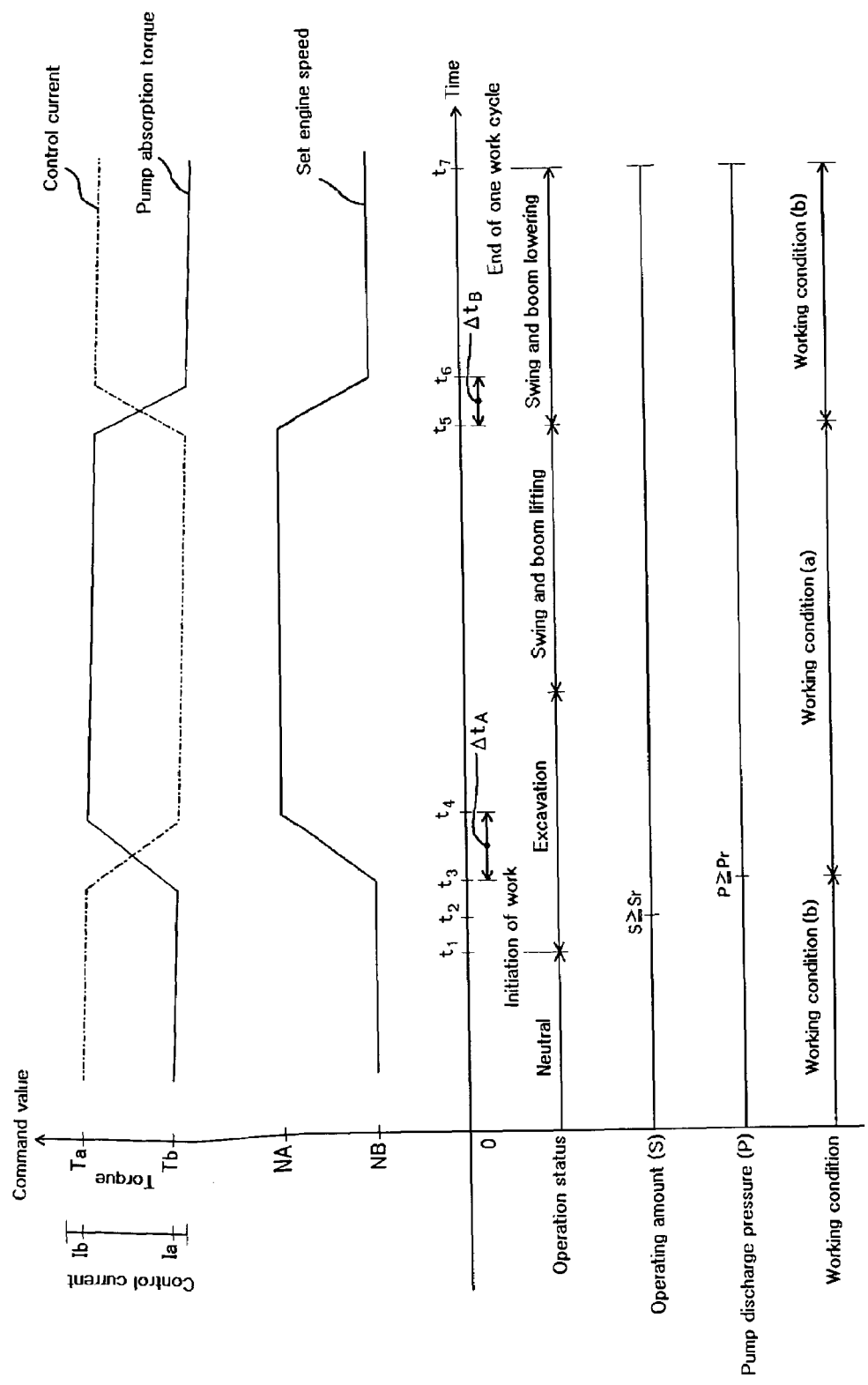
FIG. 6 is a time chart for various command values in one example of work.

Referring to FIGS. 5 and 6, a description is provided hereinafter of operation of the hydraulic drive device of the present embodiment in one example of work performed by hydraulic excavator 1. FIG. 5 shows the characteristic lines illustrating relationships between the output torque of the engine and the absorption torque of the hydraulic pump, while FIG. 6 is a time chart for the various command values in the example of work. This example of work involves, in one cycle, excavating earth, scooping up the excavated earth with bucket 9, swinging upper structure 4 while lifting boom 7, loading a dump truck with the earth from bucket 9 and then swinging upper structure 4 while lowering boom 7 to return to the initial state. Also, this example of work is done on precondition that:

(1) hydraulic excavator 1 performs the work in a fixed position;

(2) fuel dial 23 is set in the full position; and (3) the economy mode is selected.

At time $t_1$, the work begins with the excavation of the earth. Before and soon after the initiation of the work, working condition identifying unit 41 identifies working condition (b). Accordingly, engine 17 is operated based on engine output torque characteristic line ELb, and hydraulic pump absorption torque characteristic line PLb is selected as the absorption torque characteristic of hydraulic pump 18. While the pump discharge pressure is low because of light load, engine 17 is operated along regulation line Rb of engine output torque characteristic line ELb according to the magnitude of the load. Increase in the pump load pressure leads to the output torque of engine 17 being matched with the absorption torque of hydraulic pump 18 at output torque point Mb which is specified by engine speed Nb at which output (horsepower) of engine 17 reaches a maximum when engine output torque characteristic line ELb is set and output torque Tb of engine 17 that corresponds to engine speed Nb (Hereinafter, such a condition is referred to as "matching"). The output of engine 17 and output of hydraulic pump 18 are thus restrained, and consequently, the total amount of unnecessary fuel consumption is reduced.

At time $t_2$, the operating amount of the lever associated with the operation of arm 8 and bucket 9 is detected as being equal to or more than specified amount Sr, and at time $t_3$, the discharge pressure (load pressure) of hydraulic pump 18 is detected as being equal to or more than specified pressure Pr. Accordingly, working condition identifying unit 41 identifies working condition (a) at time $t_3$. Upon receiving this identification result, throttle command controller 44 gradually increases the second throttle signal from (NB) to (NA) between times $t_3$ and $t_4$, while control current command controller 43 gradually decreases the control current from Ib to Ia between these times $t_3$ and $t_4$. The modulations are thus effected for respective switches from engine output torque characteristic line ELb corresponding to working condition (b) to engine output torque characteristic line ELa corresponding to working condition (a) and from hydraulic pump absorption torque characteristic line PLb corresponding to working condition (b) to hydraulic pump absorption torque characteristic line PLa corresponding to working condition (a). As a result of these switches, the output torque of engine 17 is matched with the absorption torque of hydraulic pump 18 at output torque point Ma which is specified by engine speed Na at which the output (horsepower) of engine 17 reaches a maximum when engine output torque characteristic line ELa is set and output torque Ta of engine 17 that corresponds to engine speed Na. This matching allows effective absorption of the maximum horsepower of engine 17 by hydraulic pump 18, thereby enabling high-efficiency earth excavating motion as well as high-efficiency swinging/boom-up motion.

At time $t_5$ where the swinging/boom-up motion changes to swinging/boom-down motion, working condition identifying unit 41 identifies working condition (b). Upon receiving this identification result, throttle command controller 44 gradually decreases the second throttle signal from (NA) to (NB) between times $t_5$ and $t_6$, while control current command controller 43 gradually increases the control current from Ia to Ib between these times $t_5$ and $t_6$. The modulations are thus effected for respective switches from engine output torque characteristic line ELa corresponding to working condition (a) to engine output torque characteristic line ELb corresponding to working condition (b) and from hydraulic pump absorption torque characteristic line PLa corresponding to working condition (a) to hydraulic pump absorption torque characteristic line PLb corresponding to working condition (b). As a result of these switches, the output torque of engine 17 is matched with the absorption torque of hydraulic pump 18 at output torque point Mb. The output of engine 17 and the output of hydraulic pump 18 are thus restrained, and consequently, the total amount of unnecessary fuel consumption is reduced.

Between times $t_4$ and $t_5$, hydraulic pump control system 40b controls the absorption torque of hydraulic pump 18 so that hydraulic pump absorption toque characteristic line PLa increases the absorption torque of hydraulic pump 18 with increase in the engine speed and reduces the absorption torque of hydraulic pump 18 with decrease in the engine speed. Between times $t_1$ and $t_3$ as well as between times $t_6$ and $t_7$, hydraulic pump control system 40b controls the absorption torque of hydraulic pump 18 so that hydraulic pump absorption torque characteristic line PLb increases the absorption torque of hydraulic pump 18 with increase in the engine speed and reduces the absorption torque of hydraulic pump 18 with decrease in the engine speed. In the present embodiment, respective output torque points Ma, Mb of engine output torque characteristic lines ELa, ELb in FIG. 5 are designated as points of matching between the output torque of engine 17 and the absorption torque of hydraulic pump 18. However, the matching points are not limited to these output torque points. Alternatively, the output torque of engine 17 may be matched with the absorption torque of hydraulic pump 18 at output torque points corresponding to respective engine speeds which are in the vicinity of respective engine speeds Na, Nb corresponding to output torque points Ma, Mb. In such a case, it is more preferable that the output torque of engine 17 be matched with the absorption torque of hydraulic pump 18 at, for example, output torque points $Ma_1$, $Mb_1$ corresponding to the respective engine speeds which are in the low speed range and in the vicinity of respective engine speeds Na, Nb so that hydraulic pump absorption torque characteristic lines Pla, PLb do not intersect with respective regulation lines Ra, Rb even when these Pla, PLb vary to some extent.

According to the present embodiment, pump absorption horsepower (i.e., horsepower absorbed from engine 17 by hydraulic pump 18) which is determined by engine output torque characteristic line (ELa or ELb) and hydraulic pump absorption torque characteristic line (PLa or PLb) is changed according to the change of working condition which is identified by working condition identifying unit 41. Therefore, optimum control of the pump absorption horsepower can be performed according to the change of working condition, whereby the unnecessary fuel consumption can be eliminated, resulting in reduction in the total amount of fuel consumption. Moreover, the modulations are effected for the respective switches between engine output torque characteristic lines (ELa, ELb) and between hydraulic pump absorption torque characteristic lines (PLa, PLb), so that, for example, a steep change in the engine speed and impact on hydraulic actuator 20 and others can be eased.

Figure 7:
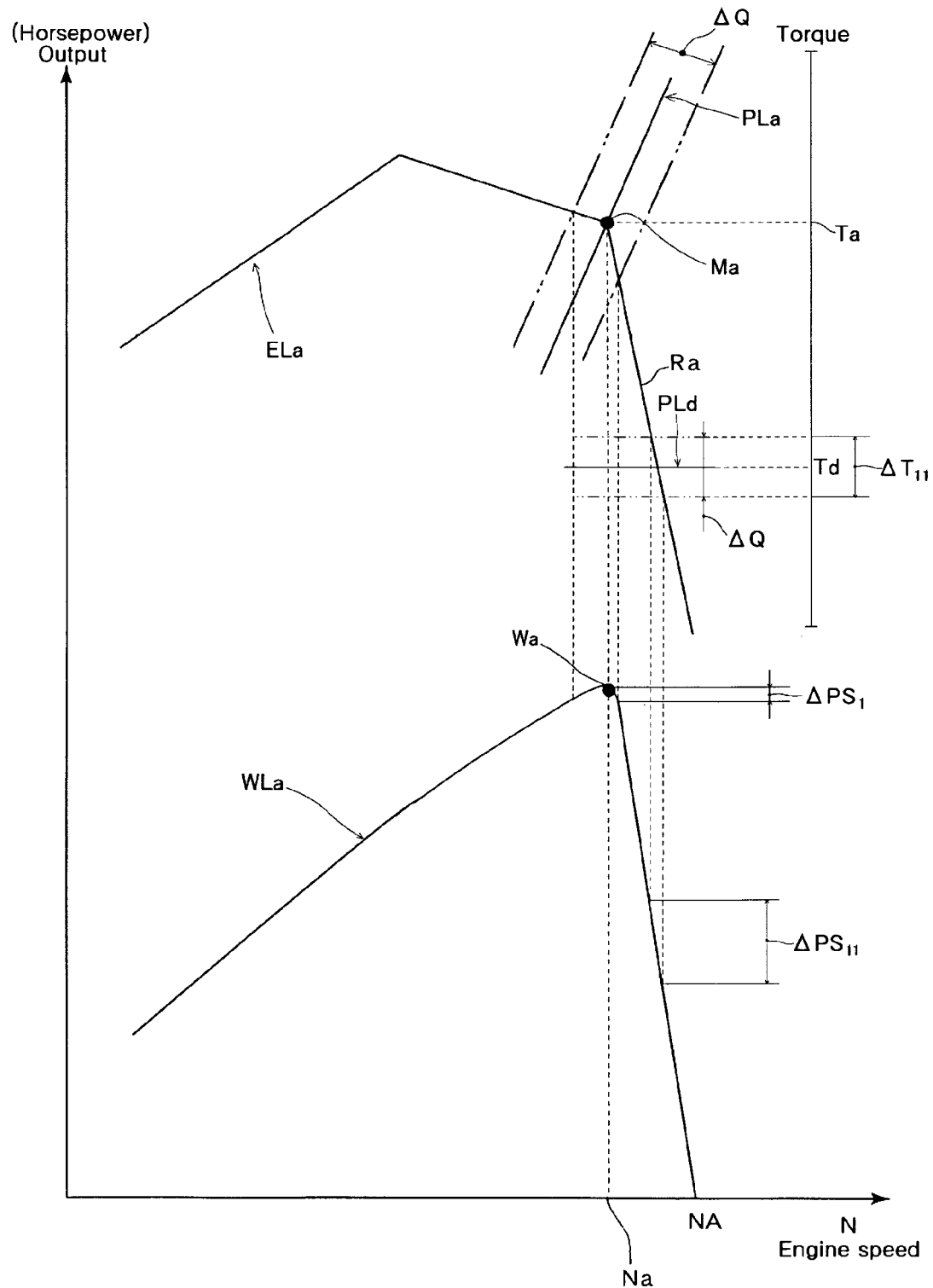
FIG. 7 illustrates a restrictive effect of pump absorption horsepower variation in accordance with the first embodiment.
Figure 11:
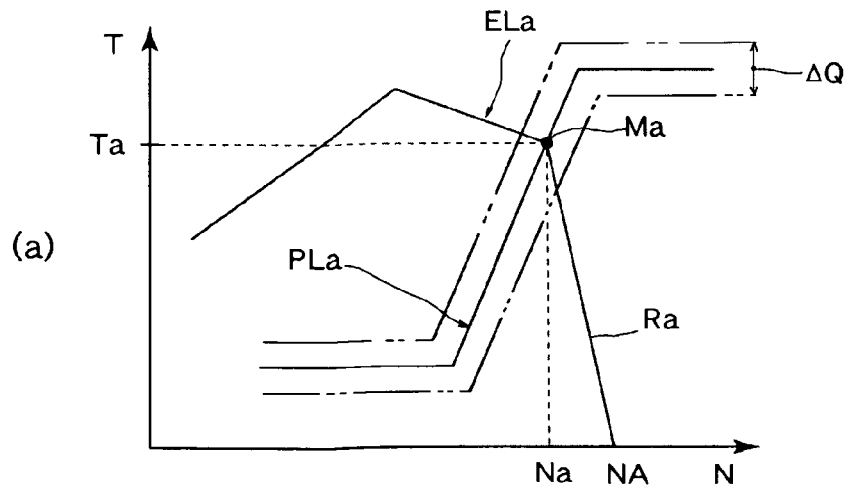
FIG. 11 illustrates prior techniques.
Figure 11:
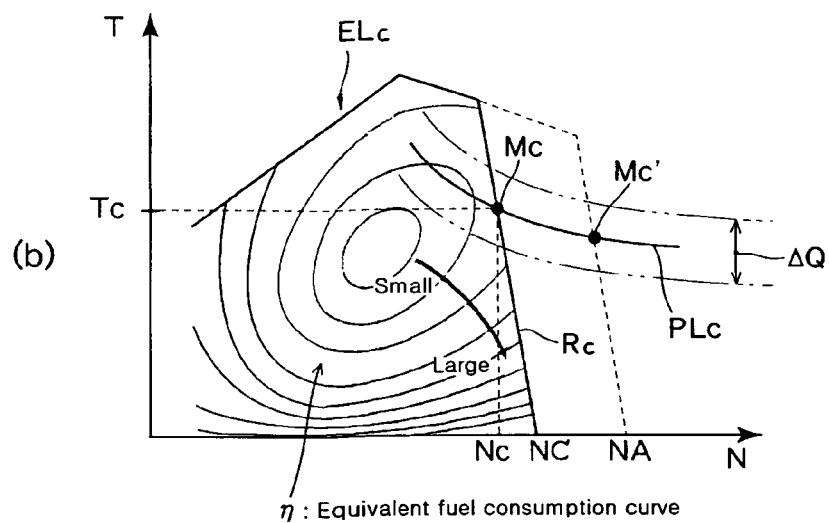
Figure 11:
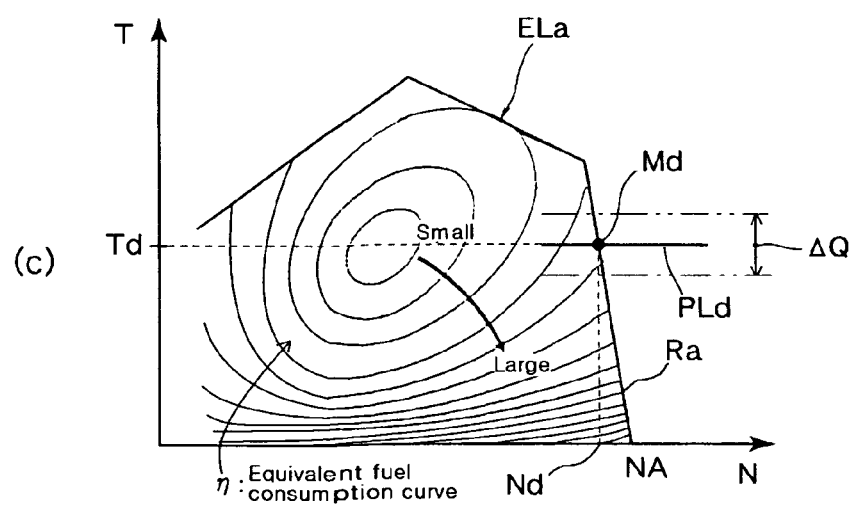

According to this embodiment, when working condition identifying unit 41 identifies working condition (a), as shown in FIG. 7, engine output torque characteristic line ELa corresponding to working condition (a) is set, and hydraulic pump absorption torque characteristic line PLa is set, matching the output torque of engine 17 with the absorption torque of hydraulic pump 18 at output torque point Ma which is specified by engine speed Na at which the output (horsepower) of engine 17 reaches the maximum when engine output torque characteristic line ELa is set and output torque Ta of engine 17 that corresponds to engine speed Na. Accordingly, even if hydraulic pump absorption torque characteristic line PLa varies as indicated by variation width $\Delta Q$ due to a manufacturing problem or the like of hydraulic pump 18, hydraulic pump 18 always absorbs the engine horsepower in the vicinity of maximum output point Wa of engine output characteristic line WLa which corresponds to engine output torque characteristic line ELa. Compared to engine horsepower variation width $\Delta PS_{11}$ which results when hydraulic pump absorption torque characteristic line PLd set across regulation line Ra varies as indicated by variation width $\Delta Q$, engine horsepower variation width $\Delta PS_1$ which results when hydraulic pump absorption torque characteristic line PLa varies as indicated by variation width $\Delta Q$ is significantly smaller. This means that with the relationship between engine output torque characteristic line ELa and hydraulic pump absorption torque characteristic line PLa, pump absorption horsepower variation width $\Delta PS_1$ corresponding to working condition (a) can be restrained significantly compared with pump absorption horsepower variation width $\Delta PS_{11}$ of a prior technique (see FIG. 11(c)) which sets hydraulic pump absorption torque characteristic line PLd across regulation line Ra. Consequently, favorable working efficiency is maintained. It goes without saying that this description of the restrictive effect of the pump absorption horsepower variation also explains that pump absorption horsepower variation width $\Delta PS_1$ can be restrained significantly compared with a pump absorption horsepower variation width of another prior technique illustrated by FIG. 11(b).

Although not illustrated in the drawing, the relationship between engine output torque characteristic line ELb and hydraulic pump absorption torque characteristic line PLb which are set when working condition identifying unit 41 identifies working condition (b) provides an advantage similar to the above-described pump absorption horsepower variation restrictive effect.

Figure 8:
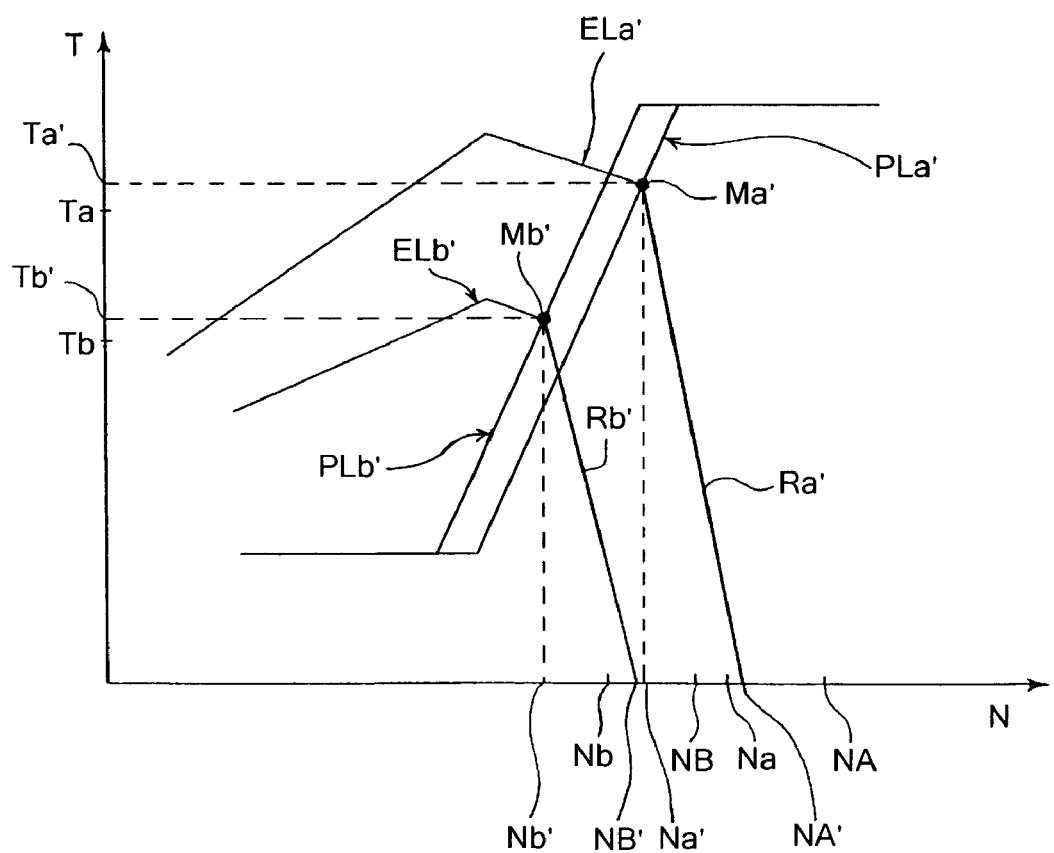
FIG. 8 shows characteristic lines illustrating relationships between the output torque of the engine and the absorption torque of the hydraulic pump at part throttle setting.

In the present embodiment, the position in which fuel dial 23 is set has a linear relation with the first throttle signal. For example, in cases where fuel dial 23 is set in a 70% position in relation to the full position, potentiometer 23a outputs first throttle signal $Thr_{(70\%)}$ to throttle command controller 44 as shown in FIG. 3. Upon receiving this first throttle signal $Thr_{(70\%)}$, throttle command controller 44 outputs second throttle signal (NA') in place of (NA) or (NB') in place of (NB) to engine controller 22. If engine controller 22 receives second throttle signal (NA'), engine controller 22 sets, in place of engine output torque characteristic line ELa corresponding to second throttle signal (NA), engine output torque characteristic line ELa' having regulation line Ra' set for a specified speed lower than a speed for which regulation Ra of engine output torque characteristic line ELa is set. If engine controller 22 receives second throttle signal (NB'), this controller 22 sets, in place of engine output torque characteristic line ELb corresponding to second throttle signal (NB), engine output torque characteristic line ELb' having regulation line Rb' set for a specified speed lower than a speed for which regulation Rb of engine output torque characteristic line ELb is set. First throttle signal $Thr_{(70\%)}$ output to throttle command controller 44 from potentiometer 23a is thereafter passed through working condition identifying unit 41 to pump absorption torque command controller 42. Upon receiving this first throttle signal $Thr_{(70\%)}$, pump absorption torque command controller 42 sets hydraulic pump absorption torque characteristic line PLa' in place of hydraulic pump absorption torque characteristic line PLa or hydraulic pump absorption torque characteristic line PLb' in place of hydraulic pump absorption torque characteristic line PLb. Hydraulic pump absorption torque characteristic line PLa' is a result of hydraulic pump absorption torque characteristic line PLa being parallel shifted and located in a lower speed range which is specified speeds away from the line PLa. As shown in FIG. 8, this characteristic line PLa' increases the absorption torque of hydraulic pump 18 with increase in the engine speed and reduces the absorption torque of hydraulic pump 18 with decrease in the engine speed for matching the absorption torque of hydraulic pump 18 with the output torque of engine 17 at output torque point Ma' which is specified by engine speed Na' at which the output (horsepower) of engine 17 reaches a maximum when engine output torque characteristic line ELa' is set and output torque Ta' of engine 17 that corresponds to engine speed Na'. Hydraulic pump absorption torque characteristic line PLb' is a result of hydraulic pump absorption torque characteristic line PLb being parallel shifted and located in a lower speed range which is specified speeds away from the line PLb. As shown in FIG. 8, this characteristic line PLb' increases the absorption torque of hydraulic pump 18 with increase in the engine speed and reduces the absorption torque of hydraulic pump 18 with decrease in the engine speed for matching the absorption torque of hydraulic pump 18 with the output torque of engine 17 at output torque point Mb' which is specified by engine speed Nb' at which the output (horsepower) of engine 17 reaches a maximum when engine output torque characteristic line ELb' is set and output torque Tb' of engine 17 that corresponds to engine speed Nb'. In cases where working condition identifying unit 41 identifies working condition (a), the output torque of engine 17 is matched with the absorption torque of hydraulic pump 18 at output torque point Ma'. In cases where working condition identifying unit 41 identifies working condition (b), the output torque of engine 17 is matched with the absorption torque of hydraulic pump 18 at output torque point Mb'.

In this embodiment, output characteristic line of engine 17 is changed from engine output torque characteristic line ELa (ELa') to engine output torque characteristic line ELb (ELb'), and absorption torque characteristic line of hydraulic pump 18 is changed from hydraulic pump absorption torque characteristic line PLa (PLa') to hydraulic pump absorption torque characteristic line PLb (PLb') when a working condition identified by identifying unit 41 has been changed from working condition (a) to working condition (b). In this case, working condition (a) corresponds to "a first working condition" in the invention, working condition (b) corresponds to "a different working condition" in the invention, engine output torque characteristic line ELa (ELa') corresponds to "a first engine output torque characteristic" in the invention, engine output torque characteristic line ELb (ELb') corresponds to "a different engine output torque characteristic" in the invention, hydraulic pump absorption torque characteristic line PLa (PLa') corresponds to "a first hydraulic pump absorption torque characteristic" in the invention, and hydraulic pump absorption torque characteristic line PLb (PLb') corresponds to "a different hydraulic pump absorption torque characteristic" in the invention. When the working condition identified by working condition identifying unit 41 has been changed from working condition (b) to working condition (a), output torque characteristic line of engine 17 is changed from engine output torque characteristic line ELb (ELb') to engine output torque characteristic line ELa (ELa') and absorption torque characteristic line of hydraulic pump 18 is changed from hydraulic pump absorption torque characteristic line PLb (PLb') to hydraulic pump absorption torque characteristic line PLa (PLa'). In such a case, working condition (b) corresponds to "a first working condition" in the invention, working condition (a) corresponds to "a different working condition" in the invention, engine output torque characteristic line ELb (ELb') corresponds to "a first engine output torque characteristic" in the invention, engine output torque characteristic line ELa (ELa') corresponds to "a different engine output torque characteristic" in the invention, hydraulic pump absorption torque characteristic line PLb (PLb') corresponds to "a first hydraulic pump absorption torque characteristic" in the invention, and hydraulic pump absorption torque characteristic line PLa (PLa') corresponds to "a different hydraulic pump absorption torque characteristic" in the invention.

Second Exemplary Embodiment

Figure 9:
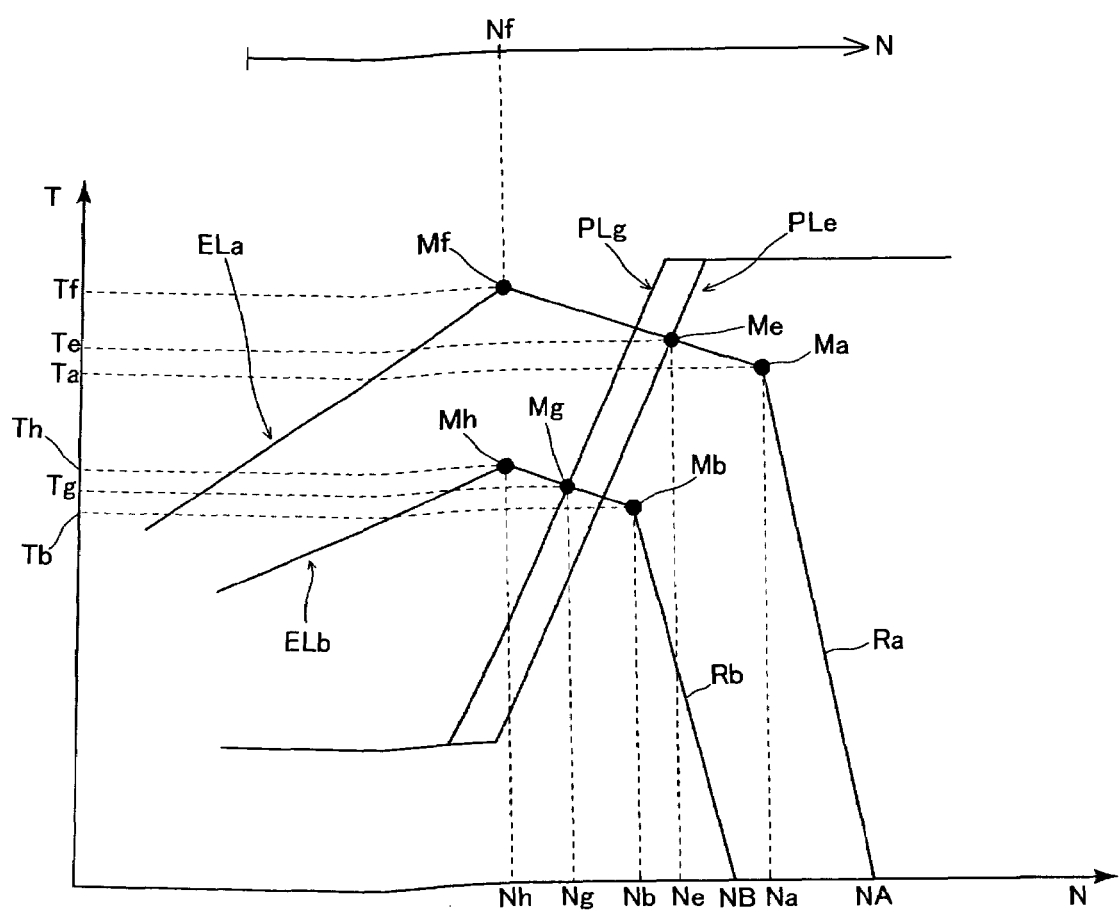
FIG. 9 shows characteristic lines illustrating relationships between output torque of an engine and absorption torque of a hydraulic pump in accordance with a second exemplary embodiment.
Figure 10:
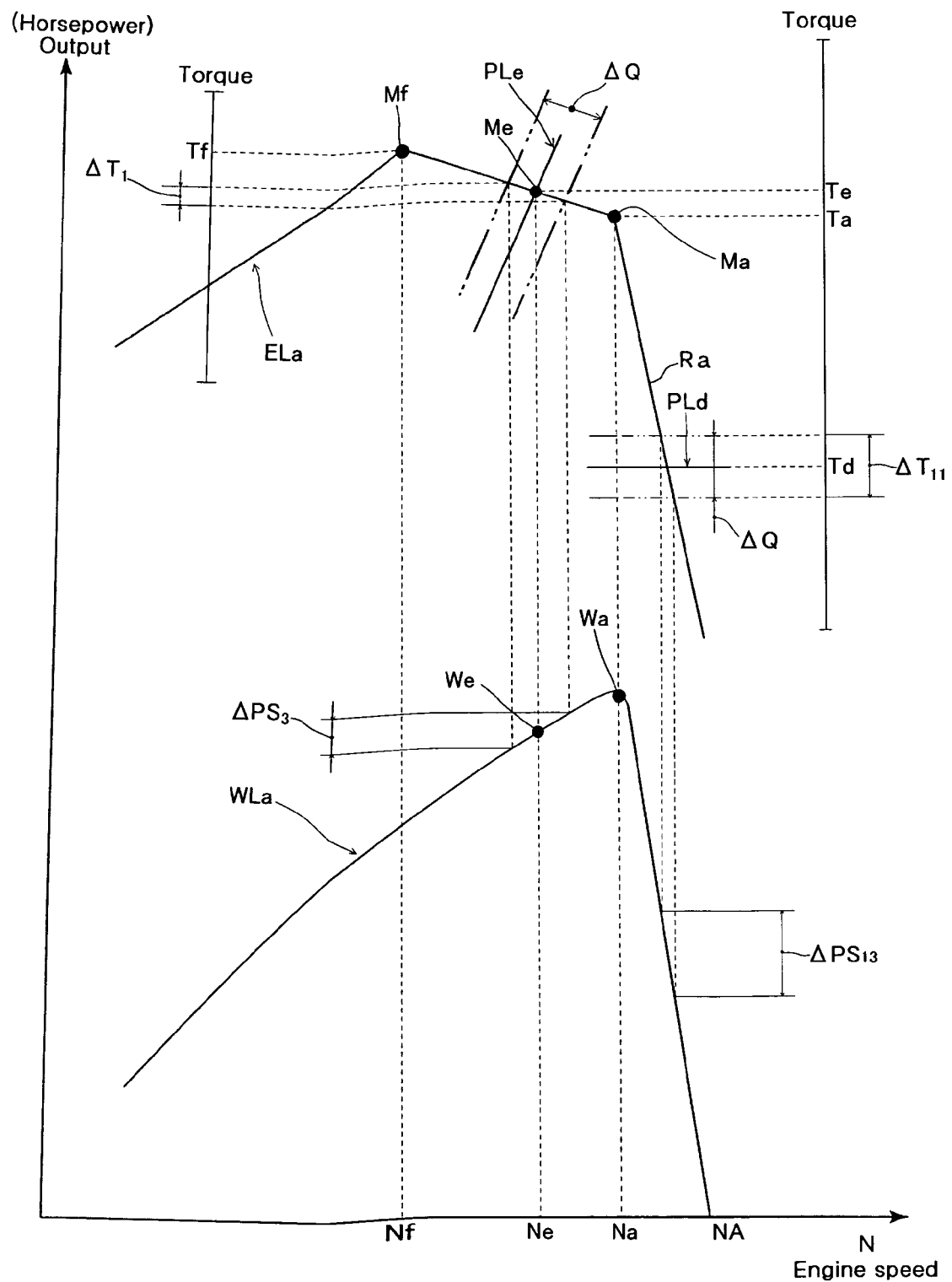
FIG. 10 illustrates a restrictive effect of pump absorption horsepower variation in accordance with the second embodiment.

A description is provided hereinafter of the second exemplary embodiment of the invention. FIG. 9 shows characteristic lines illustrating relationships between output torque of an engine and absorption torque of a hydraulic pump in accordance with the second embodiment, and FIG. 10 illustrates a restrictive effect of pump absorption horsepower variation in accordance with the second embodiment. The present embodiment is basically the same as the first embodiment, except that its relationship between an output torque characteristic of engine 17 and an absorption torque characteristic of hydraulic pump 18 differs from that of the first embodiment. Accordingly, the following description puts emphasis on the part different from that of the first embodiment.

In the present embodiment, when working condition identifying unit 41 identifies working condition (a), engine output torque characteristic line ELa corresponding to working condition (a) is set as shown in FIGS. 9 and 10. Also, hydraulic pump absorption torque characteristic line PLe is set, matching the output torque of engine 17 with the absorption torque of hydraulic pump 18 at output torque point Me which is specified by predetermined engine speed Ne between engine speed Nf at which the output torque of engine 17 reaches a maximum when engine output torque characteristic line ELa is set and engine speed Na at which output (horsepower) of engine 17 reaches a maximum when engine output torque characteristic line ELa is set and output torque Te of engine 17 that corresponds to this predetermined engine speed Ne. These settings allow hydraulic pump 18 to absorb the engine horsepower at engine output (horsepower) point We of engine output characteristic line WLa that corresponds to engine speed Ne. It should also be noted that hydraulic pump absorption torque characteristic line PLe increases the absorption torque of the hydraulic pump with increase in the engine speed and reduces the absorption torque of the hydraulic pump with decrease in the engine speed. Even if hydraulic pump absorption torque characteristic line PLe varies as indicated by variation width $\Delta Q$ of FIG. 10 due to a manufacturing problem or the like of hydraulic pump 18, variation width $\Delta T_1$ of the absorption torque of hydraulic pump 18 can be restrained significantly compared with variation width $\Delta T_{11}$ of the absorption torque of the hydraulic pump in a prior technique (see FIG. 11(c)) which sets hydraulic pump absorption torque characteristic line PLd across regulation line Ra. Accordingly, pump absorption horsepower variation width $\Delta PS_3$ can be restrained significantly compared with pump absorption horsepower variation width $\Delta PS_{13}$ of the prior technique, whereby favorable working efficiency can be maintained. It goes without saying that this description of the restrictive effect of the pump absorption horsepower variation also explains that pump absorption horsepower variation width $\Delta PS_3$ can be restrained significantly compared with a pump absorption horsepower variation width of another prior technique illustrated by FIG. 11(b).

When working condition identifying unit 41 identifies working condition (b), engine output torque characteristic line ELb corresponding to working condition (b) is set as shown in FIG. 9. Also, hydraulic pump absorption torque characteristic line PLg is set, matching the output torque of engine 17 with the absorption torque of hydraulic pump 18 at output torque point Mg which is specified by predetermined engine speed Ng between engine speed Nh at which the output torque of engine 17 reaches a maximum when engine output torque characteristic line ELb is set and engine speed Nb at which the output (horsepower) of engine 17 reaches a maximum when engine output torque characteristic line ELb is set and output torque Tg of engine 17 that corresponds to this predetermined engine speed Ng. The relationship between these engine output torque characteristic line ELb and hydraulic pump absorption torque characteristic line PLg provides an advantage similar to the above-described pump absorption horsepower variation restraining advantage.

Similarly to the first embodiment, the present embodiment is capable of reducing fuel consumption by optimum control of pump absorption horsepower and maintaining the favorable working efficiency by restraining the pump absorption horsepower variation.

In this embodiment, when working condition identifying unit 41 determines that the working condition has changed from working condition (a) to working condition (b), output torque characteristic line of engine 17 is changed from engine output torque characteristic line ELa to engine output torque characteristic line Elb, and absorption torque characteristic line of hydraulic pump 18 is changed from hydraulic pump absorption torque characteristic line PLe to hydraulic pump absorption torque characteristic line PLg. In this case, working condition (a) corresponds to "a first working condition" in the invention, working condition (b) corresponds to "a different working condition" in the invention, engine output torque characteristic line ELa corresponds to "a first engine output torque characteristic" in the invention, engine output torque characteristic line ELb corresponds to "a different engine output torque characteristic" in the invention, hydraulic pump absorption torque characteristic line PLe corresponds to "a first hydraulic pump absorption torque characteristic" in the invention, and hydraulic pump absorption torque characteristic line PLg corresponds to "a different hydraulic pump absorption torque characteristic" in the invention. When working condition identifying unit 41 determines that the working condition has changed from working condition (b) to working condition (a), output torque characteristic line of engine 17 is changed from engine output torque characteristic line ELb to engine output torque characteristic line Ela, and absorption torque characteristic line of hydraulic pump 18 is changed from hydraulic pump absorption torque characteristic line PLg to hydraulic pump absorption torque characteristic line PLe. In such a case, working condition (b) corresponds to "a first working condition" in the invention, working condition (a) corresponds to "a different working condition" in the invention, engine output torque characteristic line ELb corresponds to "a first engine output torque characteristic" in the invention, engine output torque characteristic line ELa corresponds to "a different engine output torque characteristic" in the invention, hydraulic pump absorption torque characteristic line PLg corresponds to "a first hydraulic pump absorption torque characteristic" in the invention, and hydraulic pump absorption torque characteristic line PLe corresponds to "a different hydraulic pump absorption torque characteristic" in the invention.

The invention claimed is:
1. A hydraulic drive device for a work machine, comprising:
an engine;
a hydraulic pump driven by the engine;
a hydraulic actuator operated by pressure oil discharged from the hydraulic pump;
working condition identifying means for identifying working conditions;
engine controlling means for controlling output torque of the engine; and
hydraulic pump controlling means for controlling absorption torque of the hydraulic pump,
wherein when the working condition identifying means identifies a first working condition of the working conditions, the engine controlling means controls the output torque of the engine to achieve a first engine output torque characteristic corresponding to the first working condition, and the hydraulic pump controlling means controls the absorption torque of the hydraulic pump so as to match the output torque of the engine that substantially corresponds to an engine speed at which output of the engine reaches a maximum when the first engine output torque characteristic is set with the absorption torque of the hydraulic pump that corresponds to said engine speed, wherein when the working condition identifying means identifies a different working condition of the working conditions, the engine controlling means controls the output torque of the engine to achieve a different engine output torque characteristic corresponding to the different working condition, and the hydraulic pump controlling means controls the absorption torque of the hydraulic pump so as to match the output torque of the engine that substantially corresponds to an engine speed at which output of the engine reaches a maximum when the different engine output torque characteristic is set with the absorption torque of the hydraulic pump that corresponds to said engine speed, and wherein when the working condition identifying means determines that the working condition has changed from the first working condition to the different working condition, the engine controlling means changes the engine output torque characteristic from the first one to the different one, and the hydraulic pump controlling means changes the hydraulic pump absorption torque characteristic from the first one to the different one.

2. The hydraulic drive device of claim 1, wherein:
the working condition identifying means includes at least one of operation status detecting means for detecting an operation status of the hydraulic actuator and discharge pressure detecting means for detecting discharge pressure of the hydraulic pump; and
the working condition identifying means identifies the working conditions based on at least one of a detection result provided by the operation status detecting means and a detection result provided by the discharge pressure detecting means.

3. The hydraulic drive device of claim 2, wherein:
the engine controlling means gradually changes the engine output torque characteristic from the first one to the different one; and
the hydraulic pump controlling means gradually changes the hydraulic pump absorption torque characteristic from the first one to the different one.

4. The hydraulic drive device of claim 1, wherein:
the engine controlling means gradually changes the engine output torque characteristic from the first one to the different one; and
the hydraulic pump controlling means gradually changes the hydraulic pump absorption torque characteristic from the first one to the different one.

5. The hydraulic drive device of claim 1, wherein
when the working condition identifying means identifies a first working condition of the working conditions, the hydraulic pump controlling means controls the absorption torque of the hydraulic pump so as to match the output torque of the engine that corresponds exactly to an engine speed at which output of the engine reaches a maximum when the first engine output torque characteristic is set with the absorption torque of the hydraulic pump that corresponds to said engine speed, and when the working condition identifying means identifies a different working condition of the working conditions, the hydraulic pump controlling means controls the absorption torque of the hydraulic pump so as to match the output torque of the engine that corresponds exactly to an engine speed at which output of the engine reaches a maximum when the different engine output torque characteristic is set with the absorption torque of the hydraulic pump that corresponds to said engine speed.

6. A hydraulic drive device for a work machine, comprising:
an engine;
a hydraulic pump driven by the engine;
a hydraulic actuator operated by pressure oil discharged from the hydraulic pump;
working condition identifying means for identifying working conditions;
engine controlling means for controlling output torque of the engine; and
hydraulic pump controlling means for controlling absorption torque of the hydraulic pump, wherein when the working condition identifying means identifies a first working condition of the working conditions, the engine controlling means controls the output torque of the engine to achieve a first engine output torque characteristic corresponding to the first working condition, and the hydraulic pump controlling means controls the absorption torque of the hydraulic pump to achieve a first hydraulic pump absorption torque characteristic matching the output torque of the engine that corresponds to a predetermined engine speed between an engine speed at which the output torque of the engine reaches a maximum and an engine speed at which output of the engine reaches a maximum when the first engine output torque characteristic is set, with the absorption torque of the hydraulic pump corresponding to said engine speed, the first hydraulic pump absorption torque characteristic increasing the absorption torque of the hydraulic pump with increase in the engine speed and reducing the absorption torque of the hydraulic pump with decrease in the engine speed, wherein when the working condition identifying means identifies a different working condition of the working conditions, the engine controlling means controls the output torque of the engine to achieve a different engine output torque characteristic corresponding to the different working condition, and the hydraulic pump controlling means controls the absorption torque of the hydraulic pump to achieve a different hydraulic pump absorption torque characteristic matching the output torque of the engine that corresponds to a predetermined engine speed between an engine speed at which the output torque of the engine reaches a maximum and an engine speed at which output of the engine reaches a maximum when the different engine output torque characteristic is set, with the absorption torque of the hydraulic pump corresponding to said engine speed, the different hydraulic pump absorption torque characteristic increasing the absorption torque of the hydraulic pump with increase in the engine speed and reducing the absorption torque of the hydraulic pump with decrease in the engine speed, and wherein when the working condition identifying means determines that the working condition has changed from the first working condition to the different working condition, the engine controlling means changes the engine output torque characteristic from the first one to the different one, and the hydraulic pump controlling means changes the hydraulic pump absorption torque characteristic from the first one to the different one.

7. The hydraulic drive device of claim 6, wherein:
the working condition identifying means includes at least one of operation status detecting means for detecting an operation status of the hydraulic actuator and discharge pressure detecting means for detecting discharge pressure of the hydraulic pump; and the working condition identifying means identifies the working conditions based on at least one of a detection result provided by the operation status detecting means and a detection result provided by the discharge pressure detecting means.

8. The hydraulic drive device of claim 7, wherein:

the engine controlling means gradually changes the engine output torque characteristic from the first one to the different one; and the hydraulic pump controlling means gradually changes the hydraulic pump absorption torque characteristic from the first one to the different one.

9. The hydraulic drive device of claim 6, wherein:

the engine controlling means gradually changes the engine output torque characteristic from the first one to the different one; and the hydraulic pump controlling means gradually changes the hydraulic pump absorption torque characteristic from the first one to the different one.

* * * * *